United States Patent [19]

Hoshino et al.

[11] 4,183,761
[45] Jan. 15, 1980

[54] SILICA BRICKS AND METHOD FOR MANUFACTURING SILICA BRICKS

[75] Inventors: Yoshiaki Hoshino; Tokuaki Hatta; Masahiro Sakai, all of Kitakyushu, Japan

[73] Assignee: Kurosaki Refractories Co., Ltd., Kitakyushu, Japan

[21] Appl. No.: 934,128

[22] Filed: Aug. 16, 1978

[30] Foreign Application Priority Data

Sep. 10, 1977 [JP] Japan .................. 52/109248

[51] Int. Cl.$^2$ .................. C04B 35/14; C04B 35/56; C04B 35/58
[52] U.S. Cl. .................. 106/69; 106/44; 106/73.5
[58] Field of Search .................. 106/44, 69, 73.5

[56] References Cited

U.S. PATENT DOCUMENTS

| 3,215,547 | 11/1965 | Parr | 106/69 |
| 3,236,665 | 2/1966 | King | 106/69 |
| 3,681,113 | 8/1972 | Yoldas | 106/69 |
| 3,684,538 | 8/1972 | Wright | 106/69 |

Primary Examiner—O. R. Vertiz
Assistant Examiner—Mark Bell
Attorney, Agent, or Firm—Frank J. Jordan

[57] ABSTRACT

Present invention provides silica bricks of improved thermal conductivity and low gas permeability and method for manufacturing such silica bricks. The manufacturing method is substantially characterized in that siliceous raw mixture includes 0.5 to 10 percent by weight of nitride or carbide of metallic silicon and that, in the firing process from 1200° to 1400° C., the temperature elevation speed and the oxygen concentration at the exhaust port of the firing furnace take specific rates respectively different from the corresponding rates of conventional firing. In the above firing process, the nitride or carbide of metallic silicon is oxidized to form $SiO_2$ and this $SiO_2$ fills in pores of the matrix whereby silica bricks produced by the method of this invention can have high thermal conductivity and low gas permeability.

4 Claims, 10 Drawing Figures

SILICA BRICKS AND METHOD FOR MANUFACTURING SILICA BRICKS

BACKGROUND OF INVENTION

This invention relates to a silica brick which has a dense structure and an improved thermal conductivity and a method for manufacturing such silica bricks.

Silica bricks are extensively used for the construction of hot blast stoves, open-hearth furnaces and coke ovens.

However, taking silica bricks used in the construction of a coke oven, for example, due to the properties of the quartz included in the raw material, the improvement of the density of the final products (silica bricks) is extremely difficult.

Therefore, even a conventional silica brick of high density which usually is termed as "dense silica brick" or "super duty silica brick" can decrease the porosity to a level of 18 percent at minimum.

Since the coke ovens, in general, are subjected to continuous service over long periods extending up to twenty years or more, the volume stability at high temperatures is of vital importance in the construction of ovens with silica bricks. Therefore, it is important that such silica bricks for the construction of coke ovens include no residual quartz after firing, namely the quartz should be entirely converted into cristobalite or tridymite.

Therefore, such silica bricks must be fired at a temperature higher than the firing temperature of silica bricks for other uses. Such firing however, inevitably rises the thermal expansion rate at firing so that the silica bricks can hardly obtain the porosity of less than 18 percent even when raw mixture has a favorable particle-size distribution.

Along with the demand for enhancement of the productivity of the carbonized material and the NOx regulation which has become very strict lately, the improvement of the quality of the bricks which are used for constructing the wall of coke chambers has become strongly requested these days. Various studies and experiments have been made for that purpose and such studies have developed a method which improves the density and the thermal conductivity of bricks with mere physical addition of metallic oxide such as $Cu_2O$, $TiO_2$ or $Fe_2O_3$ and another method which improves the thermal conductivity with physical mixing or addition of a material of high thermal conductivity such as silicon carbide.

However, in the former method, the refractoriness and refractoriness under the load of the silica bricks have both decreased sharply. Thereby, such method has fatal defects in the manufacturing of coke oven bricks. While the final product (the brick) produced by the latter method still contains a considerable amount of SiC after firing. Namely, in the latter method, the SiC amount is intentionally left in the silica brick due to the reason that SiC, which has good thermal conductivity, would improve the thermal conductivity of the entire silica brick. However, the silicon carbide remaining in the silica bricks is oxidized during the service or running of the coke oven and the oxide expands volumetrically giving rise to the deterioration of the inner structure of bricks. Therefore, the bricks produced by this latter method also cause problems under service or running of coke ovens over a long period.

Only aiming at the improvement of the thermal conductivity, several bricks including magnesia bricks, corumdom bricks and corumdom-silicon carbide bricks have been developed. However, when these bricks which generally have a high thermal expansion rate are repeatedly and alternately subjected to heating and cooling, they tend to loosen the brick-made oven construction and thereby they have never been manufactured on a commercial basis.

It is an object of the present invention to provide silica bricks which can resolve the aforementioned defects of conventional bricks wherein the silica bricks of this invention can withstand long use in a hot blast store, an open hearth furnace, a glass furnace as well as a coke oven.

It is another object of the present invention to provide a method for manufacturing such silica bricks.

DETAILED DESCRIPTION OF DISCLOSURE

Hereinafter, the compositions in this specification are expressed in terms of % by weight unless otherwise specified.

The method for manufacturing such silica bricks is substantially conducted as follows.

0.5 to 10 percent by weight of either nitride or carbide of metallic silicon which is previously subjected to grinding and screening is added to silica mixture which is also previously subjected to grinding and screening. Such materials as siliceous stone, quartz rock, quartz stone are considered for the silica mixture.

Such mixture containing nitride or carbide of metallic silicon is then molded in the conventional manner and subsequently the molded mixture is fired.

Figure 1:
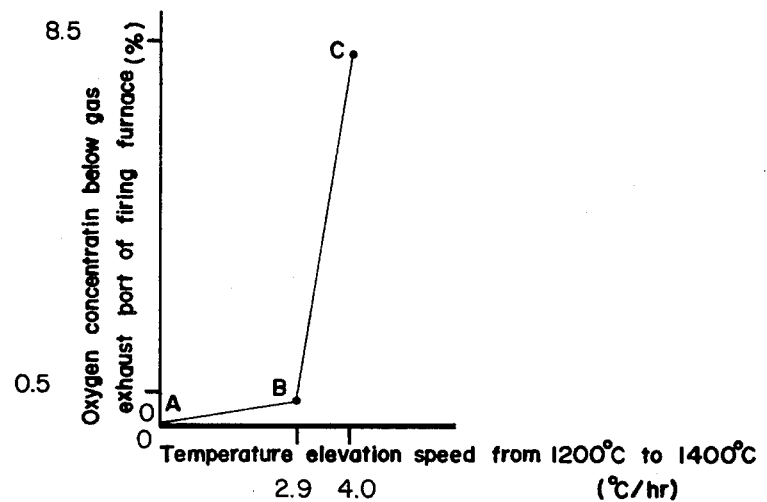
FIG. 1 is a graph showing the firing conditions from 1200° C. to 1400° C. employed in the explanation of the basic principle of this invention.

The firing of such mixture is conducted in the conventional manner until the temperature of the atmosphere of the firing furnace rises up to 1200° C. Subsequently, the firing is continued from 1200° C. to 1400° C. with a firing condition which falls in a region above a reflected line ABC of a graph shown in FIG. 1.

In the graph, the oxygen concentration below the gas exhaust port of the firing furnace (e.g., down draft kiln) is taken on the ordinate and the elevation speed of the firing temperature from 1200° C. to 1400° C. is taken on the abscissa. The plots in FIG. 1 have values shown in Table 1.

TABLE 1

| Plot | Concentration of oxygen (%) by volume | Elevation speed of firing temperature (°C./hr) |
| --- | --- | --- |
| A | 0 | 0 |
| B | 0.5 | 2.9 |
| C | 8.5 | 4.0 |

Several experiments which result in the development of the bricks of this invention and the method for manufacturing are further discussed hereinafter in conjunction with several experiments conducted therefor.

First Experiment

This experiment is effected to determine the optimal amount of an additive to silica mixture wherein silicon nitride is employed as such additive. It must be noted that throughout this experiment, the firing condition, which is of vital importance in the method of this invention, is set at a constant condition (temperature elevation speed: (c) in FIG. 2, oxygen concentration at the gas exhaust port of firing furnace(down draft kiln): 4%).

TABLE 2

| Silicon nitride addition (%) | Theoretical properties of brick after oxidation | | Actual properties of brick produced by this experiment | | | |
| --- | --- | --- | --- | --- | --- | --- |
| | Rate of weight increase (%) | Rate of porosity decrease (%) | Bulk specific gravity | Bulk specific gravity increase (%) | apparent porosity % by volume | porosity decrease (%) |
| 0 | 0 | 0 | 1.82 | 0 | 21.2 | 0 |
| 0.5 | 0.14 | 0.24 | 1.88 | 3.3 | 17.5 | 3.7 |
| 1 | 0.29 | 0.47 | 1.90 | 4.4 | 16.6 | 4.6 |
| 3 | 0.86 | 1.41 | 1.92 | 5.5 | 15.7 | 5.5 |
| 5 | 1.43 | 2.35 | 1.93 | 6.0 | 15.0 | 6.2 |
| 7 | 2.00 | 3.29 | 1.94 | 6.6 | 14.2 | 7.0 |
| 10 | 2.86 | 4.70 | 1.95 | 7.1 | 13.0 | 8.2 |

In theory, when the silicon nitride is completely oxidized, the brick increases in weight thereof corresponding to the increase of the addition amount of silicon nitride. Assuming that the volume or three dimentional sizes of the manufactured bricks do not vary even when the silicon nitride addition varies in quantity from zero percent, the theoretical porosity decrease of such bricks are assumed to take the calculated values shown in the left column of Table 2.

However, in the actual experiment, the measured values revealed a sharp decrease of the apparent porosity. Namely, the measured porosity decrease was some ten times greater than the theoretical porosity decrease at low silicon-nitride addition and even at high silicon nitride addition, the measured porosity decrease was two to three times greater than the theoretical porosity decrease.

It has been proved through this first experiment that the apparent specific gravity decreases corresponding to the increase of silicon nitride addition provided that the method is conducted under the specific firing conditions of this invention. Also clearly observed is a fact that the silicon nitride expands through oxidation forming $SiO_2$ and such $SiO_2$ fills in pores during the firing process and simultaneously closes such pores forming "closed pores." Such actions of silicon nitride cause a rise in the density of the brick, while lowering the gas permeability of the brick. Along with high thermal conductivity and high physical or mechanical strength, low gas permeability is one of the important characteristics of blocks used for the construction of the walls of a coke chamber of a coke oven.

As can be observed from Table 2, the addition of silicon nitride brings about the above-mentioned favorable properties to silica bricks when the amount of addition reaches around 0.5 percent by weight. However, when the addition of silicon nitride exceeds 10 percent by weight, the surface sealing effect (a phenomenon that only the pores on the surface are closed due to the oxidation of silicon nitride) may rapidly occur and the core of the silica brick remains in an unoxidized state. Such bricks may suffer the deterioration of necessary properties and in an extreme case may rupture. Accordingly an optimal amount of silicon nitride addition should be from 0.5 to 10 percent by weight.

Silicon carbide (SiC) can be used instead of silicon nitride ($Si_3N_4$). $Si_3N_4$ has the molecular weight of 140 and has the true specific gravity of 3.34 while SiC has the molecular weight of 40 and the true specific gravity of 3.12. Therefore, in terms of Si equivalent, an optimal amount of SiC addition approximately should be equal to the additional amount of $Si_3N_4$, namely from 0.5 to 10 percent by weight. This assumption was proven through the third experiment which is described later.

Second Experiment

In the first experiment, the oxidation which plays an important role in the manufacture of the bricks of this invention was discussed in terms of the amount of silicon nitride. However, complete oxidation of additive which provides the lowering of the gas permeability is also closely related with a firing condition from 1200° C. to 1400° C. in the firing process wherein such firing condition is determined by:

(1) firing temperature elevation speed control for full oxidation, and (2) oxygen concentration control of firing atmosphere.

Accordingly, this experiment was conducted for determining the optimal firing condition wherein temperature elevation speed from 1200° C. to 1400° C. and the mean oxygen concentration below gas exhaust port of a firing furnace (down draft kiln) were both viried to provide various firing conditions while silicon nitride ($Si_3N_4$) amount was set at constant (5%). The optimal firing conditions can be determined in terms of yield rate of the silica bricks of favorable or satisfactory properties (e.g., low porosity, high thermal conductivity). Table 3 shows the yield rates of silica bricks produced in the above firing conditions.

Table 3

| firing condition Lot | Temperature elevation speed °C./hr | mean oxygen concentration (%) by volume | Yield rate of satisfactory product after firing (%) |
|---|---|---|---|
| a | 2.85 | 1.5 | 75 |
| b | 2.5 | 5.0 | 82 |
| c | 2.22 | 2.0 | 83 |
| d | 2.0 | 1.5 | 78 |
| e | 1.81 | 3.0 | 90 |
| f | 1.66 | 2.0 | 90 |
| g | 1.54 | 6.0 | 93 |
| h | 1.45 | 1.0 | 87 |
| i | 1.33 | 3.6 | 90 |
| j | 1.25 | 0.5 | 85 |
| — | 3.3 | 2.0 | 55 |
| — | 4.0 | 3.0 | 38 |
| — | 3.7 | 7.5 | 68 |
| — | 2.0 | 0.3 | 68 |
| Conventional silica brick | 4.0 | 0–1.0 | 13 |
| " | 3.5 | 0–1.0 | 37 |

Figure 2:
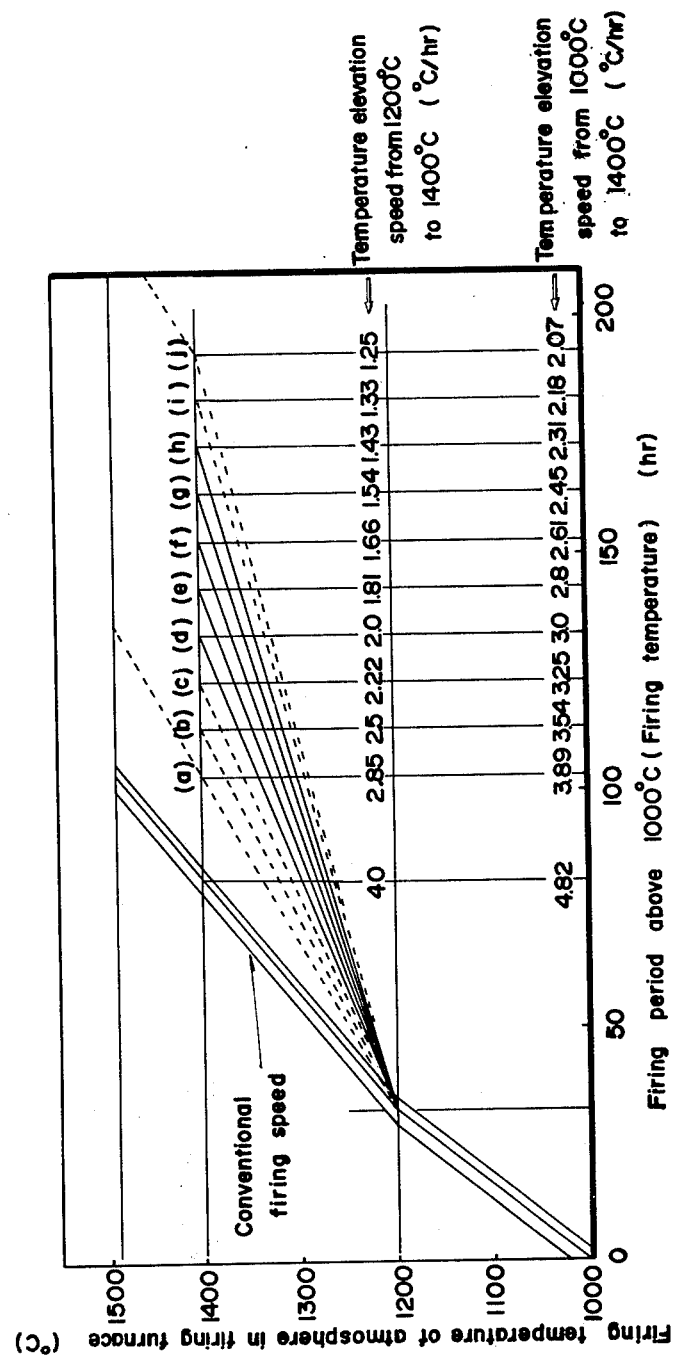
FIG. 2 is a graph showing the relationship between the firing temperature and the firing period wherein symbols (a) to (j) in the graph correspond to the symbols in Table 3.
Figure 3:
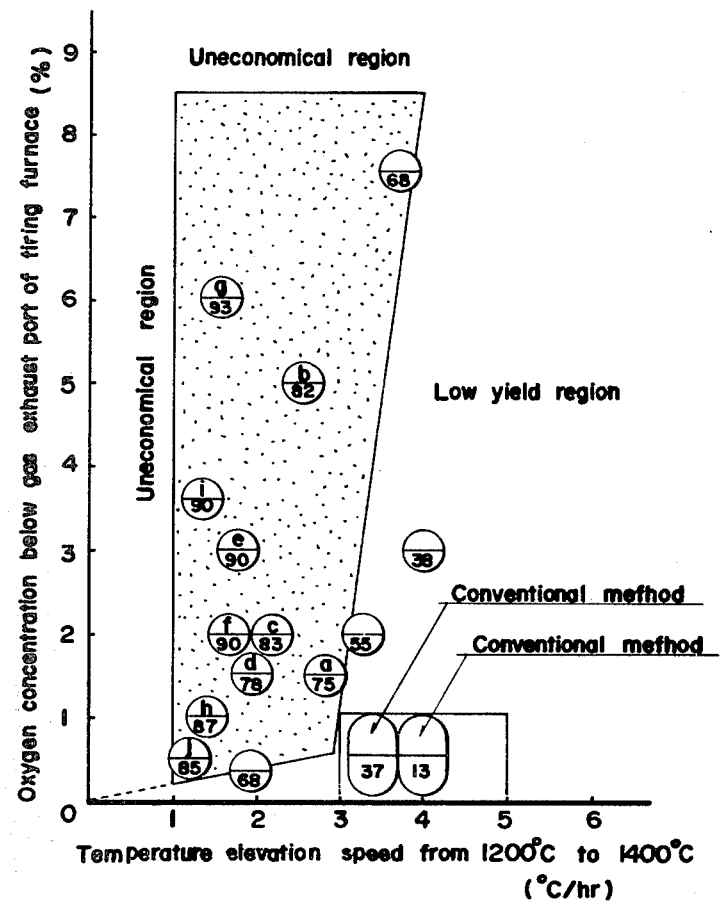
FIG. 3 is a graph showing the yields of silica bricks which vary corresponding to the changes of oxygen concentration and temperature elevation speed wherein symbols (a) to (j) correspond to those of Table 3.

The results shown in Table 3 are also illustrated in the graph of FIG. 2 while FIG. 3 is another graph which graphically shows the yield rates of bricks produced through the above firing conditions.

From the above results shown in Table 3, it has been found that firing conditions, which are determined by the relationship between the elevation speed of firing temperature from 1200° C. to 1400° C. and mean oxygen concentration below gas exhaust of firing furnace should preferably be in the dotted region shown in FIG. 3.

Third Experiment

Another experiment was conducted for comparing the silica bricks of this invention with the conventional silica bricks. One conventional method uses silica mixture which includes neither nitride nor carbide of metallic silicon while another conventional silica brick uses silica mixture which includes silica glass.

In the manufacturing of the silica bricks of this experiment, each lot employed the constant or firing condition while the conventional bricks were produced with conventional firing conditions.

The result of the experiment is shown in Table 4.

TABLE 4

| Item | | Lot | X | 1 | 2 | 3 | 4 | 5 | 6 | 7 | 8 | 9 | 10 |
|---|---|---|---|---|---|---|---|---|---|---|---|---|---|
| Silica Mixture | Siliceous stone 3.36-0mm | | 100 | 99 | 97 | 95 | 90 | 85 | 95 | 95 | 90 | 85 | 90 |
| | Silicon nitride 0.074-0mm | | — | 1 | 3 | 5 | 10 | 15 | — | — | — | — | — |
| | Silicon carbide 0.074-0mm | | — | — | — | — | — | — | 5 | 5 | 10 | 15 | — |
| | Silica glass (sol) | | — | — | — | — | — | — | — | — | — | — | 10 |
| | Slaked lime(Ca(OH)₂ solution) | | +2 | +2 | +2 | +2 | +2 | +2 | +2 | +2 | +2 | +2 | +2 |
| | Bonding agent | | +0.5 | +0.5 | +0.5 | +0.5 | +0.5 | +0.5 | +0.5 | +0.5 | +0.5 | +0.5 | +0.5 |
| Temperature elevation speed (°C./hr) | | | XX | * | * | * | * | * | XX | * | * | * | * |
| Oxygen concentration (%) by volume | | | XX | 4% | 4% | 4% | 4% | 4% | XX | 4% | 4% | 4% | 4% |
| General properties | Apparent specific gravity | | 2.31 | 2.29 | 2.28 | 2.26 | 2.24 | 2.26 | 2.28 | 2.27 | 2.25 | 2.27 | 2.31 |
| | Bulk specific gravity | | 1.81 | 1.91 | 1.92 | 1.93 | 1.95 | 1.92 | 1.92 | 1.93 | 1.95 | 1.91 | 1.80 |
| | Apparent porosity (%) by volume | | 21.6 | 16.6 | 15.4 | 14.6 | 13.0 | 15.0 | 15.7 | 15.0 | 13.3 | 15.9 | 22.0 |
| | Compression strength (kg/cm²) | | 630 | 770 | 970 | 1000 | 1300 | 850 | 900 | 1100 | 1050 | 780 | 580 |
| | Refractoriness (SK JIS) | | 32 | 32 | 32 | 32 | 32 | 31½ | 32 | 32 | 32 | — | 32 |
| | Refractoriness under load $T_L$(°C.) | | 1630 | 1640 | 1630 | 1630 | 1634 | — | 1633 | 1640 | 1630 | — | — |
| Specific properties | Thermal conductivity (K cal/mh°C.) at 350° C. | | 1.43 | 1.64 | 1.77 | 2.01 | 2.22 | — | 1.80 | 2.00 | 2.19 | — | — |
| | at 1000° C. | | 1.67 | 1.87 | 2.02 | 2.12 | 2.34 | — | 2.00 | 2.10 | 2.31 | — | — |
| | Gas permeability (cc/sec) | | 0.144 | 0.032 | 0.028 | 0.024 | 0.020 | — | 0.029 | 0.026 | 0.022 | — | — |
| | Modulus of rupture (kg/cm² at 1480° C.) | | 59 | 70 | 75 | 80 | 90 | — | 73 | 78 | 85 | — | — |
| | Thermal expansion rate (%) at 1500° C. | | 1.17 | 1.14 | 1.14 | 1.13 | 1.12 | — | 1.15 | 1.14 | 1.14 | — | — |
| Degree of oxidation | | | — | ◎ | ◎ | ◎ | ◎ | # | # | ◎ | ◎ | # | — |

X Conventional dense silica brick
XX Conventional method
*(f) in FIG. 2
Core unoxidized
◎Full oxidation The silica bricks manufactured by the method of this invention showed the best properties when full oxidation occurred even at the cores of the bricks whereas when the core remained unoxidized, the bricks suffered from sharp deterioration of properties and incurred cracking or rupturing thereof.

Figure 4:
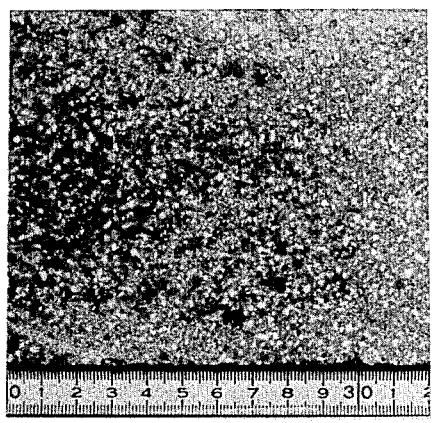
FIG. 4 to FIG. 6 are photographs showing the inner structure of silica bricks.

FIG. 4 shows a photograph of the inner structure of the silica brick (lot No. 3) produced by the method of this invention.

Figure 5:
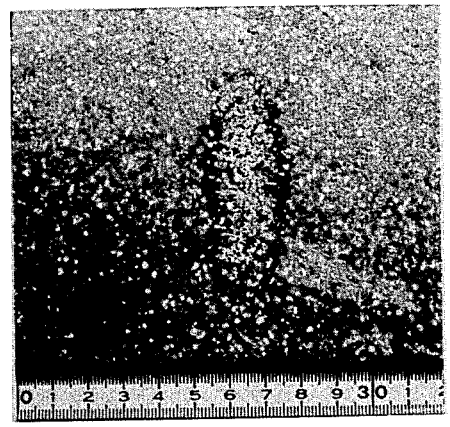
Figure 6:
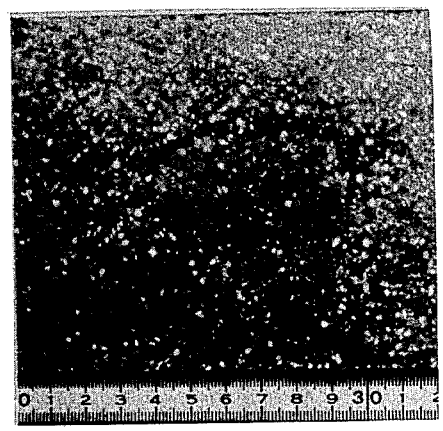

FIG. 5 and FIG. 6 show the photographs of the inner structures of silica bricks (lot No. 5 and No. 6).

As can be clearly observed from the above photographs, the silica bricks (Lot No. 3) manufactured by the method of this invention have their inner cores completely oxidized.

Figure 7:
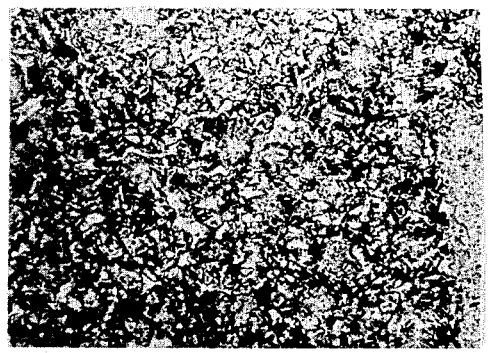
FIG. 7 and FIG. 8 are photomicrographs showing the inner structure of silica bricks.
Figure 8:
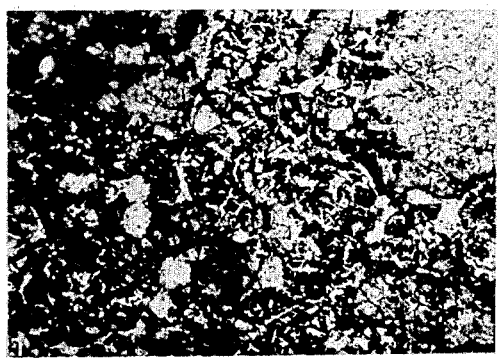

FIG. 7 shows a photomicrograph (at ×66 magnification) of the silica brick (lot No. 3) of this invention while FIG. 8 shows a photomicrograph (at ×66 magnification) of a commercially available "dense silica brick" (lot No. X).

The commercially available dense silica brick has numerous three dimensional pores in the matrix as shown in FIG. 8, whereas the silica brick of this experiment shows the dense inner structure wherein the silicon nitride particles scattered on the matrix were fully oxidized and the oxide (SiO₂) expanded and filled in the mesh-like pores.

From the above results of the experiments (First to Third Experiment), the method of the present invention for producing the silica bricks must meet the following conditions wherein one condition is to cause the oxygen concentration to rise higher than that of the conventional method and the other condition is to cause the oxygen concentration to rise at a high temperature, especially at a range from 1200° C. to 1400° C. where the oxidation in general efficiently progresses. In other words, when the oxygen concentration is expressed in terms of an oxygen concentration at the gas exhaust of a firing furnace (down draft kiln), such oxygen concentration must fall in a range above reflected line ABC shown in FIG. 1. If the economy and the yield rate of silica bricks must be taken into consideration, the sintering condition should preferably fall in closed ranges D E F G and H I J K shown in FIG. 9 and FIG. 10 respectively.

Figure 9:
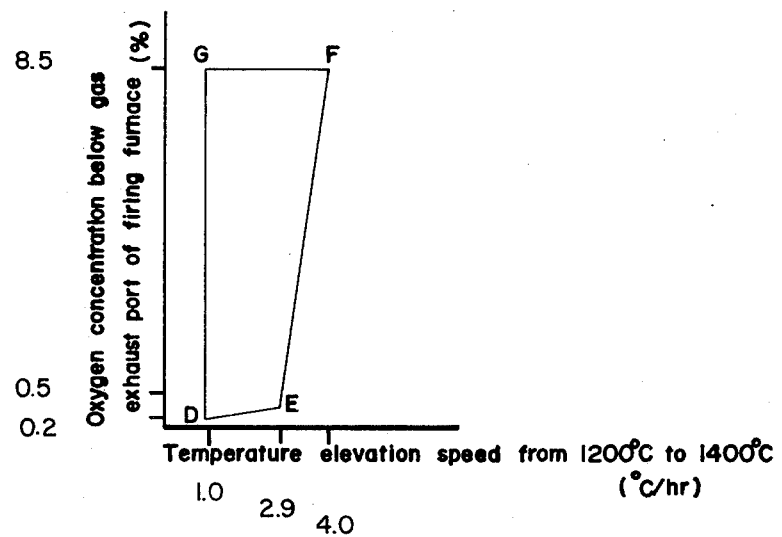
FIG. 9 and FIG. 10 are graphs showing the firing conditions from 1200° C. to 1400° C. employed in the third embodiment.
Figure 10:
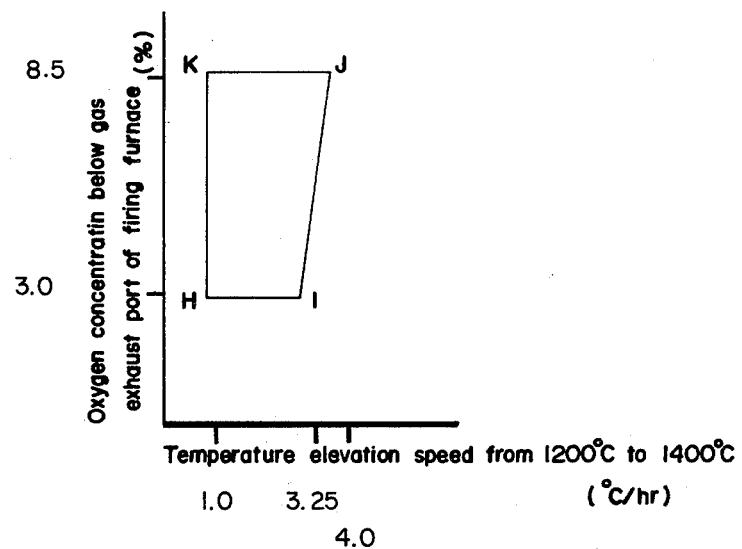

The plots D–K shown in FIG. 9 and FIG. 10 take the following values shown in Tables 5 and 6 respectively.

Table 5

|   | Oxygen concentration below exhaust port of firing furnace (%) by volume | Temperature elevating speed from 1200° C. to 1400° C. (°C./hr) |
|---|---|---|
| D | 0.2 | 1 |
| E | 0.5 | 2.9 |
| F | 8.5 | 4.0 |
| G | 8.5 | 1.0 |

TABLE 6

|   | Oxygen concentration below exhaust port of firing furnace (%) by volume | Temperature elevation speed from 1200° C. to 1400° C. (°C./hr) |
|---|---|---|
| H | 3.0 | 1.0 |
| I | 3.0 | 3.25 |
| J | 8.5 | 4.0 |
| K | 8.5 | 1.0 |

Preferably, the particle size of the additives should be considerably fine. The experiments have proven that silicon nitride or silicon carbide having a particle size of less than 0.074 mm produced a silica brick of improved properties.

As has been described heretofore, the silica bricks of this invention employ silicon nitride $Si_3N_4$ (including silica-oxi-nitride $Si_2ON_2$) or silica carbide (SiC). Such additive is fired until the additive achieves the complete oxidation. Thus produced oxide $SiO_2$ assimilates with $SiO_2$ of the matrix without incurring the deterioration of the fundamental properties of silica bricks such as the refractoriness or softening temperature under load.

Furthermore, since the additives are assimilated with the matrix as metallic oxide, the silica bricks of this invention have the same thermal expansion characteristics as that of the conventional silica brick and such silica bricks contain no compound which change the composition thereof during the long use of silica bricks. Since additives of this invention change to amorphous christobalite through oxidation, they incur a sharp drop of specific gravity. Thereby they can fill into the pores of the matrix without expanding such pores.

Accordingly, the silica bricks of this invention have the following advantages.

(1) The bulk specific density can be increased by 5 to 8 percent.
(2) The apparent porosity can be lowered such that the porosity falls in a range between 12 to 17 percent.
(3) The compression strength can be improved by 40 to 120 percent.
(4) No adverse effects occur on the fundamental properties of silica bricks including refractoriness and refractoriness under load.
(5) The thermal conductivity can be improved by 15 to 40 percent.
(6) The gas permeability may be lowered to 1/5 to 1/7 of that of conventional silica bricks.
(7) Modulus of rupture can be improved by 35 to 55 percent.
(8) The silica bricks of this invention have the same thermal expansion characteristics as that of conventional silica bricks for coke ovens and such bricks have a stable structure.

What we claim is:

1. A method for manufacturing silica bricks characterized in that 0.5 to 10% by weight of a silicon compound selected from the group consisting of silicon nitride, silicon carbide and mixtures thereof is added to silica to form a mixture and, in the firing process, said mixture is fired with a firing condition from 1200° C. to 1400° C. which falls in a region above line ABC shown in FIG. 1.

2. A method for manufacturing silica bricks according to claim 1, wherein the method is characterized in that said firing condition falls in a region enclosed by a rectangular shape DEFG shown in FIG. 9.

3. A method for manufacturing silica bricks according to claim 1, wherein the method is characterized in that said firing condition falls in a region enclosed by a rectangular shape HIJK shown in FIG. 10.

4. A method for manufacturing silica bricks according to claim 1, wherein the particle size of said silicon compound is less than 0.074 mm.

* * * * *